United States Patent
Inoue et al.

(10) Patent No.: US 8,548,223 B2
(45) Date of Patent: Oct. 1, 2013

(54) INSPECTION SYSTEM AND METHOD

(75) Inventors: Takafumi Inoue, Kanagawa (JP); Hideo Tsuchiya, Tokyo (JP)

(73) Assignee: NuFlare Technology, Inc., Numazu-shi (JP)

( * ) Notice: Subject to any disclaimer, the term of this patent is extended or adjusted under 35 U.S.C. 154(b) by 371 days.

(21) Appl. No.: 13/005,048

(22) Filed: Jan. 12, 2011

(65) Prior Publication Data
US 2011/0176719 A1 Jul. 21, 2011

(30) Foreign Application Priority Data
Jan. 18, 2010 (JP) .................. 2010-008396

(51) Int. Cl.
*G06K 9/00* (2006.01)
(52) U.S. Cl.
USPC ............................................. 382/145; 716/30
(58) Field of Classification Search
USPC ............................................. 382/145; 716/30
See application file for complete search history.

(56) References Cited

U.S. PATENT DOCUMENTS

| | | | |
|---|---|---|---|
| 2004/0225488 A1* | 11/2004 | Wang et al. | 703/22 |
| 2006/0051682 A1* | 3/2006 | Hess et al. | 430/5 |
| 2006/0239535 A1* | 10/2006 | Takada et al. | 382/145 |
| 2008/0081385 A1* | 4/2008 | Marella et al. | 438/14 |
| 2008/0127027 A1* | 5/2008 | Gallatin et al. | 716/19 |

FOREIGN PATENT DOCUMENTS

| | | |
|---|---|---|
| EP | 1 012 779 B1 | 6/2000 |
| JP | 2001-516898 | 10/2001 |
| JP | 2007-513385 | 5/2007 |
| JP | 2007-536560 | 12/2007 |
| JP | 2008-112178 | 5/2008 |
| JP | 2009-105430 | 5/2009 |

OTHER PUBLICATIONS

U.S. Appl. No. 13/705,663, filed Dec. 5, 2012, Tsuchiya, et al.
Japanese Office Action issued Dec. 6, 2011, in Patent Application No. 2010-008396 (with English-language translation).
U.S. Appl. No. 13/768,392, filed Feb. 15, 2013, Inoue, et al.
U.S. Appl. No. 13/792,364, filed Mar. 11, 2013, Inoue, et al.

* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

Optical image data of a mask is acquired. Reference image data associated with the optical images is created from design pattern data. Regional image data that includes pixel values denoted by multi-valued resolution based on importance level information of the patterns is created from region data including at least one portion of the patterns defined in the design pattern data. Defect determination is conducted on a pixel-by-pixel basis by comparing the optical image data with the reference image data, by means of either a plurality of threshold values determined by each pixel value within the regional image data or a plurality of defect determination methods. Image data of a section whose Mask Error Enhancement Factor (MEEF) is equal to or greater than a predetermined value is created from the region data including at least one portion of the patterns defined in the design pattern data.

7 Claims, 8 Drawing Sheets

| Rank Code (Use of Pattern) | Sensitivity Specification Information |
|---|---|
| 1. Clock | Level 4 |
| 2. Power supply | Level 2 |
| 3. Shield | Level 1 |
| 4. Dummy | Level 1 |
| Data Type Code (Pattern Code Type) | Sensitivity Specification Information |
| A. OPC | Level 1 |
| B. Dummy | Level 1 |
| C. Assist | Level 1 |
| D. Contact | Level 4 |
| Information of MEEF region | Information to be saved |
| MEEF large (more than 2) | Level 2 |
| MEEF small (less than 2) | Level 1 |

*Fig. 8*

INSPECTION SYSTEM AND METHOD

BACKGROUND OF THE INVENTION

1. Field of the Invention

The present invention relates to an inspection system and inspection method used to detect defects of the pattern formed on an object to be inspected, such as a mask.

2. Background Art

In recent years, as the levels of integration and capacity of large scale integrated circuits (LSIs) have increased, there has been a need to continue to reduce the width of the circuit patterns of semiconductor devices. Semiconductor devices are manufactured by a reduced projection exposure apparatus called a "stepper" using original artwork patterns with a circuit pattern formed thereon, these are called masks or reticles (hereinafter referred to collectively as masks). Specifically, a pattern on a mask is transferred on to a wafer by exposure to light, thereby forming circuits on the wafer. Masks used to transfer such fine circuit patterns to the wafer are manufactured by electron beam writing apparatuses, which can write micropatterns. Further, effort has been made to develop a laser beam writing apparatus, which uses a laser beam for writing. It should be noted that electron beam apparatuses are also used to directly write a circuit pattern on a wafer.

Incidentally, since the cost to manufacture LSIs is very high, an increase in yield is required to make the manufacturing economically feasible. However, the dimensions of the patterns for LSI devices, as typified by 1-gigabit class DRAMs (random access memories), are about to be scaled down from the order of submicrons to the order of nanometers. A major cause of loss in yield is due to defects of a mask pattern. Further, since there has been a decrease in the dimensions of LSI patterns formed on semiconductor wafers, the size of pattern defects to be detected is very small. Therefore, high inspection accuracy is required of inspection systems for detecting defects of masks used in LSI manufacture.

There are two known mask defect detecting methods: the die-to-die inspection method and the die-to-database inspection method. The die-to-die inspection method is used when the mask to be inspected has thereon a plurality of identical chip patterns, or a plurality of chip patterns each including an identical pattern segment. In this method, these identical chip patterns or identical pattern segments, which are to be printed to the wafer, are compared to each other. This method permits accurate inspection using a relatively simple system configuration, since patterns on the same mask are directly compared to each other. However, this method cannot detect a defect common to both compared patterns. In the die-to-database inspection method, on the other hand, an actual pattern on a mask is compared to reference data generated from the design pattern data that was used to manufacture the mask. Thus, this method allows exact comparison of the pattern with the design pattern data, although the required system size is large since the method requires a processing system for generating a reference image. There is no choice but to use this inspection method when the mask to be inspected has only one chip pattern to be transferred to the wafer.

In die-to-die inspection, light is emitted from a light source, and the mask to be inspected is irradiated with this light through an optical system. The mask is mounted on a table, and this table is moved so that the emitted beam of light scans the surface of the mask. Light transmitted through or reflected from the mask reaches an image sensor, thereby forming an image thereon. The optical image thus formed on the image sensor is sent to a comparing unit as measurement data. The comparing unit compares the measurement data with reference data in accordance with an appropriate algorithm, and if they are not identical, the mask is determined to have a defect (see, e.g., Japanese Laid-Open Patent Publication No. 2008-112178).

Incidentally, it is not necessary to accurately control the dimensions, etc. of all the patterns formed on a mask. For example, a dummy feature or pattern, which does not serve for wiring purposes, is sometimes formed in a place where the pattern density is extremely low. No problem is presented even if this dummy feature or pattern has some "pin-hole defect" or edge roughness.

On the other hand, when the patterns formed on a mask include very small designs, it is necessary to use a high level of accuracy control, these small patterns may include a clock line or the position and the diameter of a contact hole passing through a plurality of layers.

In order to address this problem, a method has been proposed in which the level of importance, or weight, of each pattern is added to design pattern data as pattern importance information, and pattern data and pattern importance information are input into the inspection system. For example, Japanese Laid-Open Patent Publication No. 2009-105430 discloses a method for simulating a lithographic design comprised of a number of polygons arranged in a predetermined configuration. Specifically, referring to FIG. 4 of this publication, an aerial image is generated using a bitmap image available from the polygon design database (box 126), and resist modeling or simulation is performed using this aerial image (box 128).

Further, Published Japanese Translation of PCT Application No. 2001-516898 states as follows: "In any mask inspection system, the important decision to make is whether a given defect will 'print' on the underlying photoresist in a lithography process under specified conditions. If a mask defect does not print or have other effect on the lithography process, then the mask with the defect can still be used to provide acceptable lithography results. Therefore, one can avoid the expense in time and cost of repairing and/or replacing masks whose defects do not print." This publication discloses a method of receiving a defect area image including an image of a portion of a mask and generating a simulated image. This simulated image includes a simulation of an image which would be printed on to the wafer.

As discussed above, prior to inspection using conventional techniques, patterns are logically organized according to their particular degree of importance or by how their influence upon the wafer is simulated. Reducing these potential defects saves cost and time required for the inspection and repair of the mask.

When an optical image and a reference image are compared in accordance with appropriate algorithms, however, even if the pattern error lies within a predetermined data range, some specific kinds of patterns cause the defect to be enlarged after printing of the pattern onto the wafer.

The present invention has been conceived in view of the above problem. Therefore, an object of the invention is to provide a system and method for inspection of masks which reduces the possibility of defects, while at the same time extracting a pattern likely to cause defects on a wafer during pattern writing, despite the fact that the pattern is determined during a conventional inspection process not known to be defective.

Other challenges and advantages of the present invention are apparent from the following description.

SUMMARY OF THE INVENTION

The present invention relates to a mask inspection system and method. In the first embodiment, a mask inspection system comprising: a unit for acquiring optical image data of a mask having predetermined patterns formed thereupon; a unit for creating reference image data associated with the optical image data from design pattern data used as a basis to form the patterns; a unit for creating regional image data that includes pixel values denoted by multi-valued resolution based upon importance level information relating to the patterns, from region data including at least one portion of the patterns defined in the design pattern data; a comparator for, prior to defect determination on a pixel-by-pixel basis, comparing the optical image data within a region denoted by the regional image data, with the reference image data, by using one of either a plurality of threshold values determined by each pixel value within the regional image data, or a plurality of defect determination methods; and a Mask Error Enhancement Factor (MEEF) regional image data creating unit for creating image data of a section whose MEEF is equal to or greater than a predetermined value, determined by the region data including at least one portion of the patterns defined in the design pattern data.

In another embodiment of this invention, an inspection system comprising: a unit for acquiring optical image data of a mask having predetermined patterns formed thereupon; a unit for creating regional image data that includes pixel values denoted by multi-valued resolution based upon importance level information relating to the patterns, from region data including at least one portion of the patterns defined in design pattern data used as a basis to form the patterns; a comparator for, prior to defect determination on a pixel-by-pixel basis, comparing the optical images within a region denoted by the regional image data, by using one of either a plurality of threshold values determined by each pixel value within the regional image data, or a plurality of defect determination methods; and a MEEF regional image data creating unit for creating image data of a section whose MEEF is equal to or greater than a predetermined value, from the region data including at least one portion of the patterns defined in the design pattern data.

In another embodiment of this invention an inspection method comprising: acquiring optical image data from a mask having predetermined patterns formed thereupon; creating regional image data that includes pixel values denoted by multi-valued resolution based upon importance level information relating to the patterns, from region data including at least one portion of the patterns defined in design pattern data which is used as a basis to form the patterns; prior to defect determination on a pixel-by-pixel basis, comparing the optical images within a region denoted by the regional image data, by using one of either a plurality of threshold values determined by each pixel value within the regional image data, or a plurality of defect determination methods, or prior to defect determination on a pixel-by-pixel basis, creating reference image data associated with the optical images from the design pattern data, and then comparing the optical image data within a region denoted by the regional image data, with the reference image data, by means of one of either a plurality of threshold values determined by each pixel value within the regional image data, or a plurality of defect determination methods; creating image data upon a section whose MEEF is equal to or greater than a predetermined value, from the region data including at least one portion of the patterns defined in the design pattern data.

BRIEF DESCRIPTION OF THE DRAWINGS

FIG. 8 shows an example of a conversion table used in the present embodiment.

DETAILED DESCRIPTION OF THE EMBODIMENTS

Figure 1:
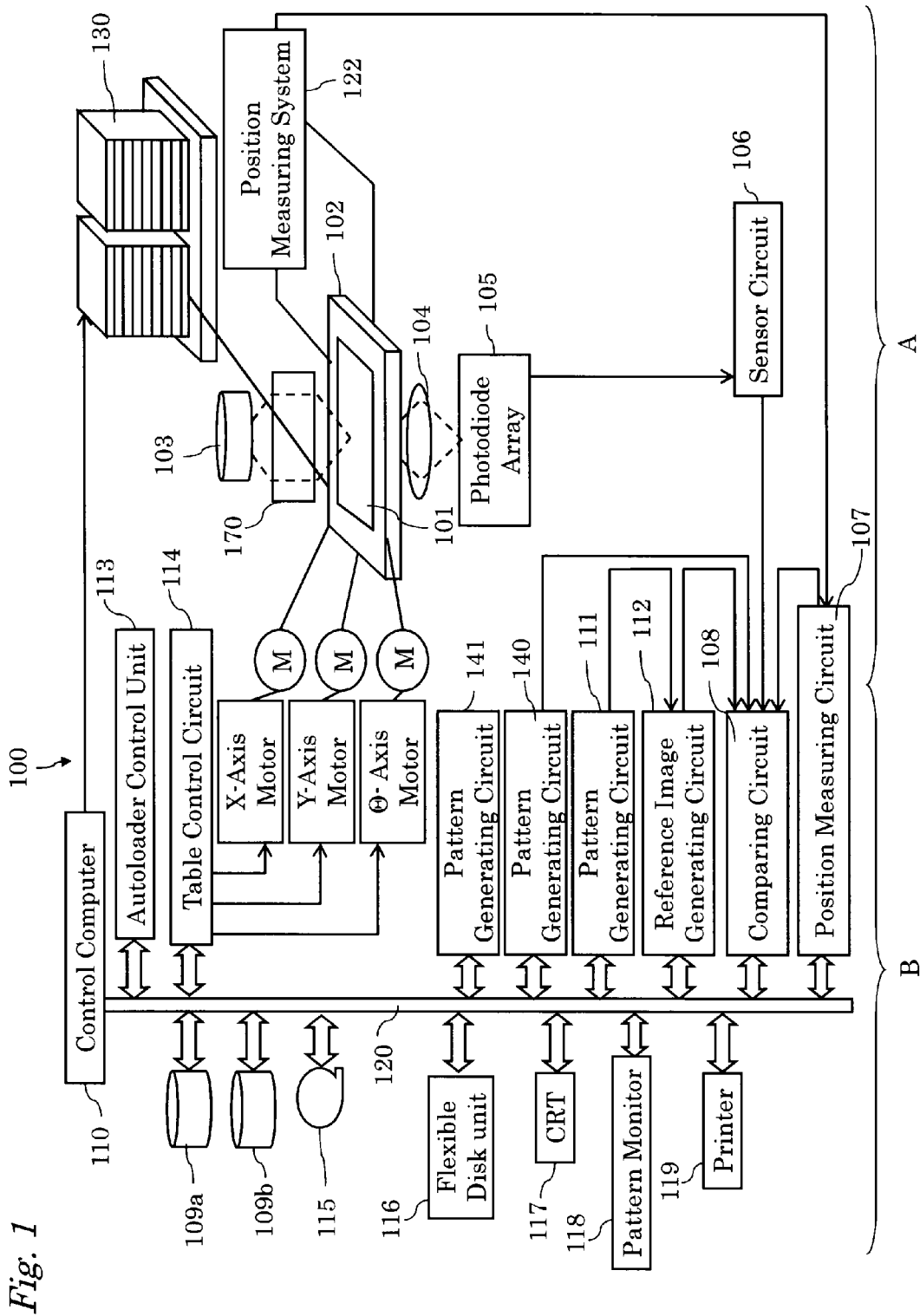
FIG. 1 is a diagram showing the configuration of an inspection system according to an embodiment of the present invention.

FIG. 1 is a diagram showing the configuration of an inspection system according to an embodiment of the present invention. The inspection system of the present embodiment will be described in connection with the inspection of masks used in photolithography.

As shown in FIG. 1, the inspection system 100 includes an optical image capture unit A and a control unit B.

The optical image capture unit A includes a light source 103, an XYθ table 102 movable in the horizontal X and Y directions and rotatable in a horizontal plane (or in a θ direction), an illumination optical system 170 serving as a transmission illumination system, an enlarging optical system 104, a photodiode array 105, a sensor circuit 106, a position measuring system 122, and an autoloader 130.

In the control unit B, a control computer 110 which controls the entire inspection system 100 is connected through a bus 120 (serving as a data transmission path) to a position measuring circuit 107, a comparing circuit 108, a reference image generating circuit 112, a pattern generating circuit 111, an autoloader control unit 113, a table control circuit 114, a primary result storage unit 109a and a secondary result storage unit 109b serving as storage units, a magnetic tape unit 115, a flexible disk unit 116, a CRT 117, a pattern monitor 118, and a printer 119. The XYθ table 102 is driven by X-, Y-, and θ-axis motors controlled by the table control circuit 114. These motors may be, for e.g., step motors.

Design pattern data which is used as reference data in die-to-database inspection is stored in the primary result storage unit 109a. This data is read out and sent to the pattern generating circuit 111 when necessary in the course of the inspection process. The pattern generating circuit 111 converts the design pattern data into image data (or bit pattern data). This image data is then sent to the reference image generating circuit 112 for generation of reference data.

It should be noted that the inspection system of the present embodiment may include, in addition to the components shown in FIG. 1 described above, other known components required to inspect masks. Further, although the present embodiment is described in connection with the die-to-database inspection method, it is to be understood that the embodiment may be applied to the die-to-die inspection method. In such a case, an optical image of one of two separate identical patterns on the mask is treated as a reference image.

Figure 2:
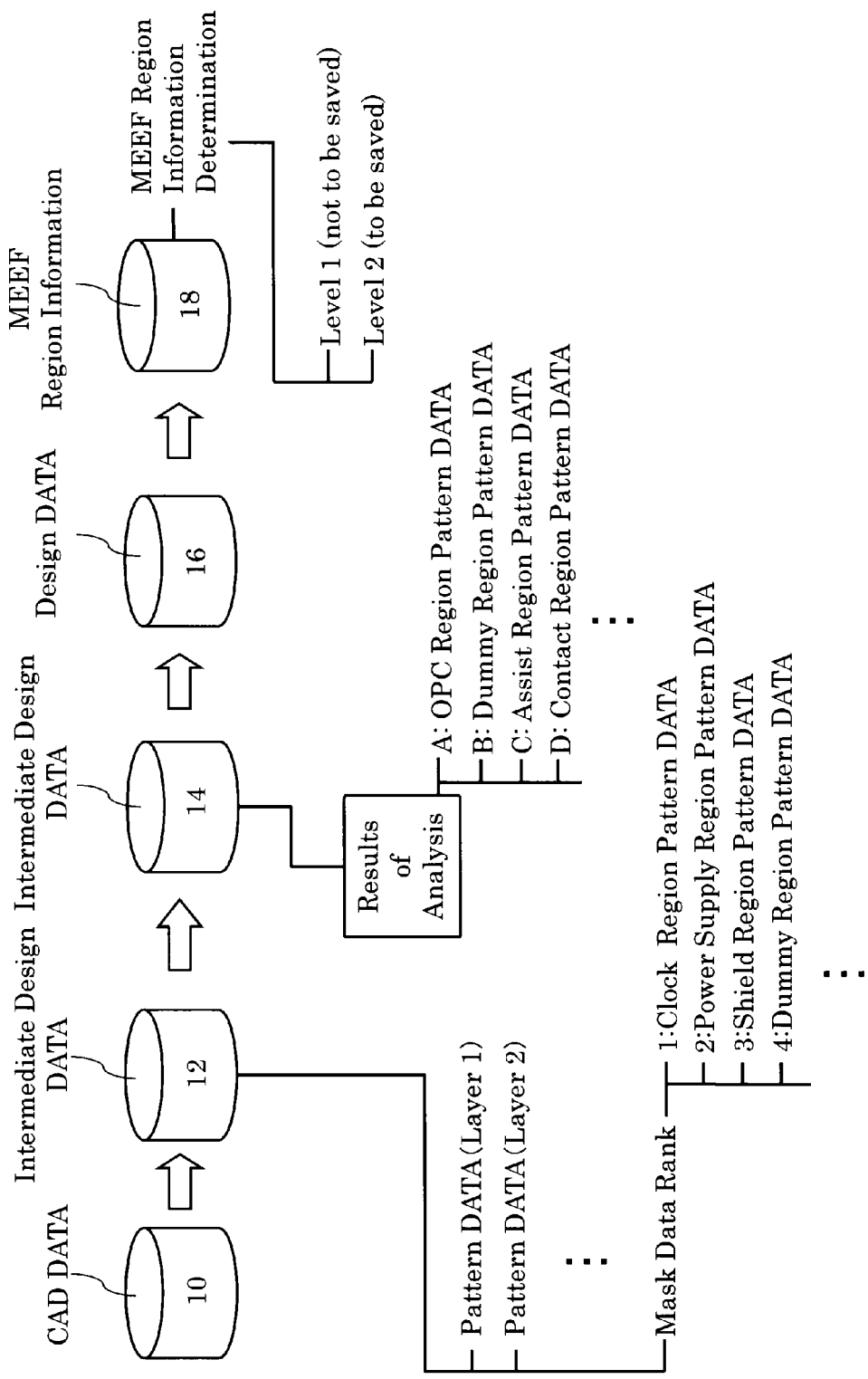
FIG. 2 is a schematic diagram showing a flow of data according to the present embodiment.

FIG. 2 is a schematic diagram showing a flow of data according to the present embodiment.

Referring to FIG. 2, CAD data 10 prepared by the user is converted into intermediate design data 12 of a layered format such as OASIS. Pattern data to be written onto photomasks 101 fabricated on a layer-by-layer basis is stored as one constituent element of the intermediate design data 12. In addition, Mask Data Rank (MDR) information arbitrarily determined by the designer who has created the CAD data 10 is stored as another element of the intermediate design data 12.

The inspection accuracy required varies from pattern to pattern, depending upon the user needs of the pattern. For this reason, data-ranking codes (as one element of importance level information) that identify data rankings and region pattern data indicative of a region including the pattern are stored as one element of the MDR information. The designer requires setting up specific determination threshold levels on a sensitivity-by-sensitivity basis. For example, it is required that high sensitivity be assigned to the pattern used for clocks, lower sensitivity to the pattern used for dummies or shields, and middle sensitivity to the pattern used for power supplies. Accordingly, as shown in FIG. 2, clock region pattern data is defined as, for example, ranking code 1, in the MDR information. Similarly, for example, power supply region pattern data is defined as ranking code 2, shield region pattern data as ranking code 3, and dummy region pattern data as ranking code 4.

The intermediate design data 12 that has been created is analyzed by a layout analyzing program built into the computer, and intermediate design data 14 is created as a result. More specifically, the layout analyzing program adds to the intermediate design data 12 a pattern for optical proximity correction (OPC), an assist pattern for enhancing the pattern resolution of the pattern to be transferred, design graphics for creating a pattern in a complex shape to maintain pattern linewidth and spacing accuracy, and/or dummy patterns.

Data type codes (as another element of importance level information) that identify the types of patterns (data types) further added to the intermediate design data 12, and the region pattern data indicative of the region including the pattern are stored as another element of the intermediate design data 14. For example, as shown in FIG. 2, OPC regional pattern data is defined as data type code A in analytical result information. Likewise, dummy regional pattern data is defined as data type code B, assist region pattern data as data type code C, and contact regional pattern data as data type code D. The patterns that have been added by the layout analyzing program are unintended when the designer creates the CAD data.

Generally the inspection system 100 is not constructed so that the OASIS data can be loaded directly. The inspection system 100 employs a specific data format according to a particular manufacturer of the system. For this reason, before being input to the inspection system 100, the OASIS data is converted into a characteristic data format of the system 100 on a layer-by-layer basis. This means that the created intermediate design data 14 is converted into design data 16 of a system input format convenient for input to the inspection system 100.

The present embodiment uses a layout analyzing program or the like to further create MEEF region information 18 from the design data 16. Alternatively, the MEEF region information may be created at the same time as the design data 16.

The MEEF is one index that indicates stability of lithography. More specifically, MEEF is a coefficient indicator of how dimensional nonuniformity of the mask will affect the transfer of the pattern on to the wafer, and is given by $$\text{MEEF} = \Delta CD_{wafer}/(\Delta CD_{mask}/\text{Reduction magnification})$$

where $\Delta CD_{mask}$ is an on-mask line width error and $\Delta CD_{wafer}$ is an on-wafer line width error induced by $\Delta CD_{mask}$.

For example, if a 4× mask is used, the reduction magnification in the above expression is 4. As can be seen from this expression, the mask pattern is transferred more precisely as the value of MEEF becomes smaller (i.e., closer to 1). Decreases in MEEF, therefore, correspondingly improve the manufacturing yield of wafers.

In general, MEEF takes a value of 1 during a lithographical process in which the width of the lines to be formed is sufficiently large enough for an exposure wavelength and therefore a high transfer contrast can be achieved. That is, the dimensional error on the mask is reduced according to the equivalent reduction in magnification and thus incorporated into the pattern size on the wafer. Conversely, if the width of the lines to be formed is smaller than the exposure wavelength, MEEF increases, often to 2, 3 or higher, in which case, the dimensional error on the mask is enlarged and correspondingly incorporated into the pattern size on the wafer. A slight dimensional error on the mask can be a critical dimensional error on the wafer.

The value of MEEF also depends on various factors such as the line widths of the design patterns, a line/space ratio, whether a defective section is close to a protrusion on the pattern, and whether the defective section is somewhere between patterns. For example, MEEF increases at a pattern of a smaller line width. In addition, MEEF increases more at a line/space ratio of 1:3 than at a line/space ratio of 1:2, that is, at a shorter distance to an isolated pattern. Furthermore, when the defective section is close to a protrusion, MEEF increases, more than when the defective section is somewhere in between patterns.

At sections whose MEEF is large, even an error of a magnitude at which the inspection system does not determine the error to be due to a defect may have impacts when the patterns are transferred onto the wafer. Irrespective of whether a defect is identified by the inspection system, therefore, the system retains information on the sections of large MEEF similarly to defective sections, and examines pattern defect printability onto the wafer via lithography simulator (also referred to as process simulator) described later herein.

In the inspection system 100, the process as described above is liable to create too much pattern data. Accordingly, it is preferable that the processing system for reading out pattern data and generating the data should be contrived for minimum inspection downtime by, for example, providing in combination a large-capacity parallel-processing computer with a high-speed processing ability, and a hard-disk unit designed to make a satisfactory response to a readout speed necessary for processing.

Figure 3:
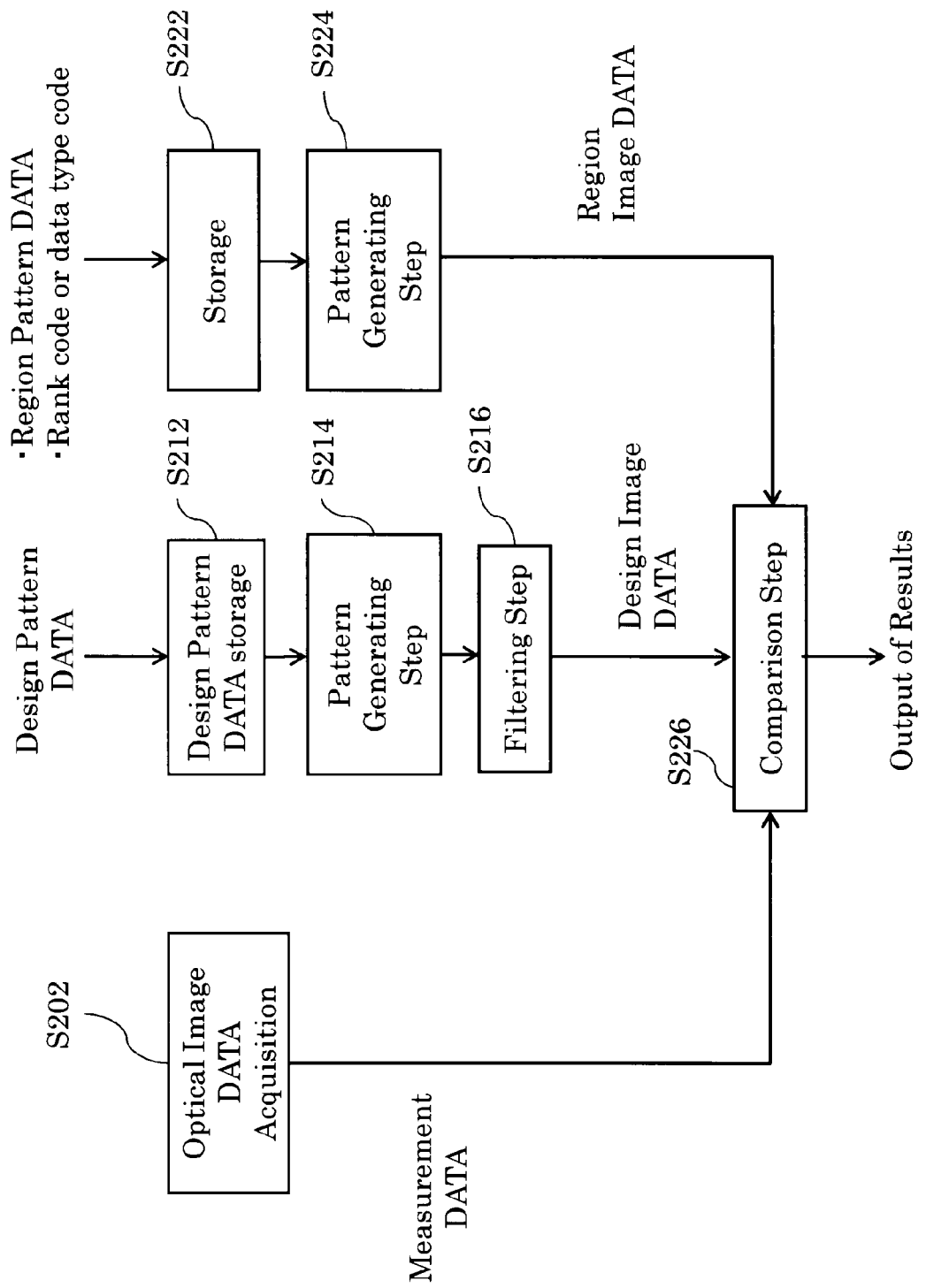
FIG. 3 is a flowchart of an inspection process.

FIG. 3 is a partial flowchart of an inspection process. As shown in FIG. 3, the inspection process includes optical image data acquisition step S202, design pattern data storage step S212, pattern generating step S214 as an example of a design image data generating step, filtering step S216, storage step S222 for region pattern data and the like, pattern generating step S224 as an example of a regional image data generating step, and comparison step S226.

At the optical image acquiring step S202, the optical image capture apparatus A shown in FIG. 1 acquires an optical image (measurement data) of a photomask 101. It will be noted that this optical image includes an image of a pattern on the mask, which pattern was written in accordance with the corresponding design pattern data. The detailed method of capturing this optical image is as follows.

In FIG. 1 the photomask 101 serving as an inspection workpiece is mounted on the XYθ table 102 provided to be movable in two horizontal directions by X- and Y-axis motors and rotatable in a horizontal plane by a θ-axis motor. The pattern formed on the photomask 101 is then irradiated with light emitted from the light source 103 disposed above the XYθ table 102. More specifically, the beam of light emitted from the light source 103 passes through the illumination optical system 170 and shines on the photomask 101. The enlarging optical system 104, the photodiode array 105, and the sensor circuit 106 are disposed below the photomask 101. The light transmitted through the photomask 101 passes through the enlarging optical system 104 and reaches the photodiode array 105, thereby forming an optical image thereon. It should be noted that the enlarging optical system 104 may have its focus automatically adjusted by an autofocus mechanism (not shown). Further, though not shown, the inspection system 100 may be constructed such that light is also emitted from a source below the photomask 101, and the reflected light is passed through an enlarging optical system to a second photodiode array, thus capturing the transmitted light and the reflected light simultaneously.

Figure 4:
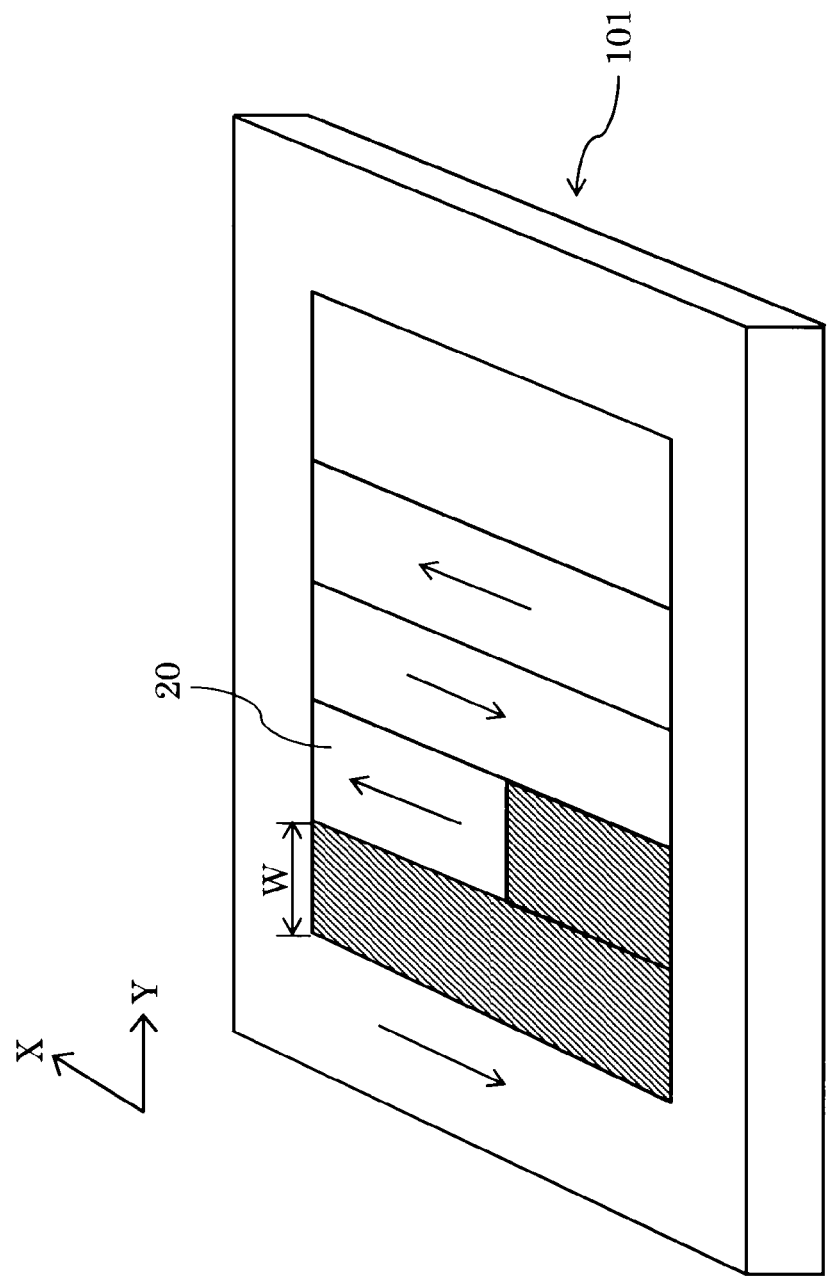
FIG. 4 is a diagram illustrating the way in which an optical image is acquired.

FIG. 4 is a diagram illustrating the way in which an optical image is captured.

The inspection area is divided into a plurality of strip-shaped inspection stripes 20 by imaginary lines running in the X direction, where the width of each inspection stripe 20 in the Y direction is equal to the scan width W, as shown in FIG. 4. The movement of the XYθ table 102 in FIG. 1 is controlled so that each inspection stripe 20 is continuously scanned in the negative or positive X direction with the light to acquire an image of the inspection stripe. At that time, the photodiode array 105 in FIG. 1 continuously generates an image (of each inspection stripe 20) having a width corresponding to the scan width W, as shown in FIG. 4. After capturing an image of the first inspection stripe 20 by scanning it, e.g., in the negative X direction, the second inspection stripe 20 is continuously scanned in the positive (i.e., opposite) X direction to acquire an image of a width corresponding to the scan width W. Likewise, the third inspection stripe 20 is scanned in the negative X direction (opposite the direction in which the second inspection stripe 20 is scanned) to acquire an image. This way of continuously capturing an image of one inspection stripe 20 after another reduces waste of processing time.

The pattern image formed on the photodiode array 105 is photoelectrically converted by the photodiode array 105 and A/D (analog to digital) converted by the sensor circuit 106. The photodiode array 105 is made up of sensors arranged in an array. These sensors may be, for e.g., TDI (Time Delay Integration) sensors. Thus, the pattern on the photomask 101 is imaged by these TDI sensors while the XYθ table 102 is continuously moved in the positive or negative X direction. The light source 103, the enlarging optical system 104, the photodiode array 105, and the sensor circuit 106 together form a high power optical system inspection.

The XYθ table 102 can be moved in the X and Y directions and rotated in a θ direction (or in an XY plane) by a drive system such as a 3-axis (X-Y-θ) motor driven by the table control circuit 114 under the control of the control computer 110. These X-, Y-, and θ-axis motors may be, for e.g., step motors. The position of the XYθ table 102 is measured by the position measuring system 122, and the measurement data is sent to the position measuring circuit 107. Further, the photomask 101 is automatically loaded onto the XYθ table 102 from the autoloader 130 driven by the autoloader control circuit 113, and, upon completion of its inspection, the photomask 101 is automatically retrieved from the XYθ table 102.

The measurement data (representing an optical image) output from the sensor circuit 106 is sent to the comparing circuit 108, together with data indicative of the position of the photomask 101 on the XYθ table 102, said data is output from the position measuring circuit 107. The measurement data is unsigned 8-bit data representing the gray scale of each pixel.

At the storage step S212 in FIG. 3, the design pattern data that was used to form the pattern on the photomask 101 is stored in the primary result storage unit 109a serving as a storage unit as shown in FIG. 1.

The designed pattern includes pattern features each consisting of basic features such as rectangles and triangles. The primary result storage unit 109a stores feature data indicating the shape, size, and position of each pattern feature, specifically, e.g., information such as the coordinates (x, y) of the reference position of each feature, the length of its sides, and a shape code (or identifier) identifying the type of shape such as a rectangle or triangle.

Further, a group of pattern features, defined in an area of approximately a few tens of micrometers square is referred to as a "cluster" or "cell". It is common practice that the design pattern data is defined in a hierarchical structure using clusters or cells. A cluster (or cell), which contains a pattern feature or features, may be used alone or repeated at certain intervals. In the former case the coordinate positions of the cluster (or cell) on the photomask are specified, whereas in the latter case the coordinate positions of each copy of the cluster (or cell) are indicated together with a repetition instruction. Each cluster (or cell) is disposed in a strip-shaped region, referred to as a "frame" or "stripe", having a width of a few hundreds of micrometers and a length of approximately 100 mm which corresponds to the length of the photomask in the X or Y direction.

At the pattern generating step S214 in FIG. 3, the pattern generating circuit 111 shown in FIG. 1 reads design pattern data of the photomask 101 from the primary result storage unit 109a through the control computer 110 and converts it into 2-bit or other multiple-bit image data (bit pattern data). This image data is sent to the reference image generating circuit 112.

Specifically, upon reading the design pattern data, the pattern generating circuit 111 generates data of each pattern feature, and interprets the shape code in the data indicative of the shape of the pattern feature and obtains its dimensions. The pattern generating circuit 111 then divides the pattern into an imaginary grid of squares (or grid elements) having predetermined quantization dimensions, and produces 2-bit or other multiple-bit design image data of the design pattern segment in each grid element. By using the produced design image data, the pattern generating circuit 111 calculates the design pattern occupancy in each grid element (corresponding to a sensor pixel). This pattern occupancy in each pixel represents the pixel value.

At the filtering step S216 in FIG. 3, after receiving the design image data the reference image generating circuit 112 performs appropriate filtering on the data.

Figure 5:
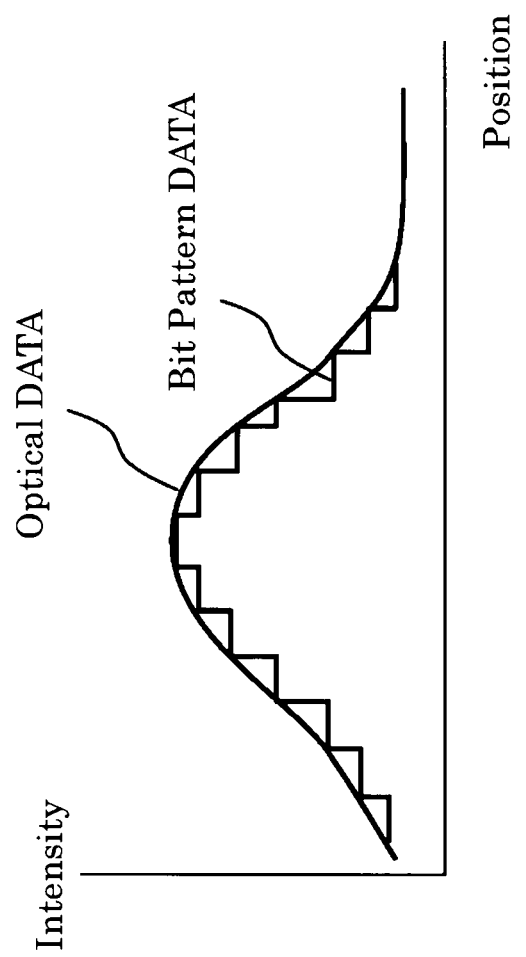
FIG. 5 is a diagram illustrating the filtering.

FIG. 5 is a diagram illustrating the filtering.

The optical image (or the measurement data representing it) output from the sensor circuit 106 is somewhat blurred due to the resolution characteristics of the enlarging optical system 104 and due to the aperture effect in the photodiode array 105, this optical image is a spatially low-pass filtered image. Therefore, since the design image data corresponding to the optical image is digital data consisting of digital values representing the intensity (or gray scale) of each point of the image, this design image data may be filtered to match the blurred optical image, or measurement data. In this way, a reference image to be compared with the optical image is produced.

The measurement data is sent to the comparing circuit 108 in FIG. 1, as described above. The design pattern data, on the other hand, is converted into design image data by the pattern generating circuit 111 and the reference image generating circuit 112, and then also sent to the comparing circuit 108.

In the present embodiment, the regional image data obtained from region pattern data and importance level information is sent to the comparator 108. The region pattern data here, although created in the same format as that of the design pattern data, is converted into the regional image data by the pattern generating circuit 140, a circuit independent of the design pattern data conversion element. By doing so, the inspection system 100 can conduct the conversion of the design pattern data and that of the region pattern data in parallel.

More specifically, in data storage step S222 of FIG. 3, the region pattern data and the importance level information are stored into the primary result storage unit 109a of FIG. 1. At this time, the information defined in the MDR discussed in FIG. 2, and the information defined in analytical result information are stored in the primary result storage unit 109a. Next in pattern generating step S224 of FIG. 3, the pattern generating circuit 140 in FIG. 1 reads the region pattern data and the importance level information from the primary result storage unit 109a through the control computer 110, and then uses the region pattern data to create regional image data based on the importance level information and including the pixel data represented by multi-valued resolution. In this step, the pixel data is set up at a resolution of ⅓₂, as an example. For this resolution level, the pixel data is defined using values of 0 to 31. A conversion table stored within the primary result storage unit 109a is used to determine the data.

FIG. 8 shows an example of a conversion table used in the present embodiment.

Correlations between ranking codes and sensitivity specification information, and correlations between data type codes and the sensitivity specification information are defined in the conversion table of FIG. 8. In this example, ranking code 1 identifying a clock pattern is associated with the sensitivity specification information of level 4. Ranking code 2 identifying a power supply pattern is associated with the sensitivity specification information of level 2. Ranking code 3 identifying a shield pattern is associated with the sensitivity specification information of level 1. Ranking code 4 identifying a dummy pattern is associated with the sensitivity specification information of level 1. In addition, data type code A identifying an OPC pattern data type is associated with the sensitivity specification information of level 1. Data type code B identifying a dummy pattern data type is associated with the sensitivity specification information of level 1. Data type code C identifying an assist pattern data type is associated with the sensitivity specification information of level 1. Data type code D identifying a contact pattern data type is associated with the sensitivity specification information of level 4. The higher the level is, the higher the sensitivity is, the more stringent the determination threshold is.

The information contained in region pattern data is based on the rectangles and triangles that denote regions. The graphics stored within the primary result storage unit 109a is information such as coordinates (x, y) of the region graphics at a reference position thereof, lengths of sides, and graphics identification codes that discriminate the graphics species of the rectangles, triangles, and the like. Briefly, graphic data with the shape, size, position, etc. of each graphic defined therein is stored. For example, a region graphic of a size with predetermined margins added to an outline of a desired pattern is specified so as to encompass the desired pattern. The margins are suitably set to have dimensions equal to a generation of the pattern or dimensions equivalent to a sensor pixel size of the inspection system. For example, a region graphic 65 nm wider on one side than that actually required is suitably set up for a 65-nm node generation of patterns.

The pattern generating circuit 140 includes a generator, a plurality of pattern generators, and a combiner.

Upon region pattern data being input to the pattern generating circuit 140, the generator generates the region pattern data into independent data for each region graphic element and interprets the graphic codes, graphic dimensions, and other data indicating the graphic shapes defined in the region graphic data. The generator also reads the conversion table from the primary result storage unit 109a. Next, the generator refers to the conversion table and acquires the sensitivity specification information of the appropriate region pattern data from a ranking code. The generator further refers to the conversion table and acquires the sensitivity specification information of the appropriate region pattern data from a data type code.

The pattern generators each generate data into regional image data that includes settings of multi-valued data in cells equivalent to pixels. Data of each pixel at this time is determined by the level of the sensitivity specification information.

The combiner combines pattern-generated region pattern data. For example, the data may be made up of a comparison sized unit to be determined by the operator or may be the size of one complete mask. Since the regions denoted by the region pattern data here are of a size obtained by adding margins to the corresponding pattern size, some of these regions are likely to overlap. Overlapping is also likely to occur between a region corresponding to a ranking code set by the designer, and a region of a pattern to which analytical results by analysis software have been added. That is, the pattern generating circuit 140 is likely to input, along with the multiple sets of region data where regions overlap, multiple sets of importance level information that form a pair with any one of the multiple sets of region data.

For example, if two regions overlap, the combiner creates regional image data that denotes a region formed by combining the multiple sets of region data at a point where the regions overlap. In addition, if overlapping occurs between the regions denoted by the different sets of region data corresponding to multiple ranking codes set by the designer, the combiner uses, pixel values of the overlapping regions denoted by the regional image data obtained after the combination, the pixel values denoted by multi-valued resolution based on the importance level information defined with a high importance level. In other words, the pixel data is matched to the sensitivity specification information of a higher level, specified by the importance level information. This prevents loose inspection of any sections that are originally to be subjected to strict inspection. If overlapping occurs between the regions denoted by the different sets of region data corresponding to multiple data type codes added by the analysis software, the combiner uses, as the pixel values of the overlapping regions, the pixel values denoted by more-than-two-valued resolution based on the importance level information defined with a high importance level.

If overlapping occurs between the region denoted by the region data corresponding to any one of the ranking codes set by the designer, and the region data corresponding to any one of the data type codes added by the analysis software, the combiner sets the corresponding pixel values as follows: the combiner uses, the pixel values of the overlapping regions which the regional image data obtained by the combination denotes, the pixel values denoted by the multi-valued resolution based on the importance level information associated with the importance level that the designer (user) desires. This enables the designer's intention to be incorporated into the regional image data.

The thus-formed regional image data is output to the comparator 108 of FIG. 1.

Step S226 in FIG. 3 is a comparison step. In this step, the comparator 108 in FIG. 1 first acquires the regional image data that the pattern generating circuit 140 has created. Next, the comparator 108 uses one of either the multiple inspection threshold levels (inspection sensitivity values) determined by the pixel values of the regional image data, or multiple defect determination methods, to compare, for each pixel, the optical image data within the region denoted by the regional image data, with reference image data, in accordance with a predetermined algorithm, and hence to determine whether defects are present. The determination is conducted, for example, with the threshold value of level 1 for pixel values of 0 to 7, the threshold value of level 2 for pixel values of 8 to 15, the threshold value of level 3 for pixel values of 16 to 23, or the threshold value of level 4 for pixel values of 24 to 31. The inspection threshold level (inspection sensitivity value) is changed on the basis of the pixel value of the regional image data, and the comparison based on the predetermined algorithm is conducted. If an error exceeding a predetermined value is detected, that section is determined to be defective. Upon the section being determined to be defective, its coordinates, the sensor-acquired image underlying the defect determination, and the reference image are stored as first inspection results into the primary result storage unit 109a.

By conducting the above, the comparator 108 uses the regional image data to judge defects while changing either the comparative determination threshold values of the regions to be compared, or the defect determination method, for each pixel. Therefore, regions to be subjected to strict defect determination can be inspected with strict determination thresholds, and regions not too important can be excluded from inspection based on more strict determination thresholds than necessary, therefore inspections can be conducted so that possible defects do not frequently occur.

The inspection method according to the present embodiment is described in further detail below using FIG. 6.

As described above, the comparator 108 conducts defect determination by comparing the optical image from the sensor circuit 106 and the reference image obtained from design pattern data by the pattern generating circuit 111 and the reference image generating circuit 112. In addition, as described above, during the defect determination, the comparator 108 acquires regional image data created from region pattern data by the pattern generating circuit 140. If a section is determined to be defective, its coordinates, the sensor-acquired image underlying the defect determination, and the reference image are stored as the first inspection results into the primary result storage unit 109a. At this time, in the present embodiment, information on sections whose information saving has been determined is stored along with the first inspection results, in accordance with MEEF region information. More specifically, after the MEEF region information to be saved has been converted into MEEF regional image data by the pattern generating circuit 141, the information relating to the sections whose information saving was determined is stored into the primary result storage unit 109a. At the sections whose MEEF is large, even an error of the magnitude at which the inspection system does not determine the error to be due to a defect may have significant impacts when the patterns are transferred onto the wafer. Irrespective of whether a defect is identified by the inspection system, therefore, the system saves information on the sections of large MEEF, similarly to defective sections.

An example of information acquisition determination based on the MEEF region information is shown in the conversion table of FIG. 8. In this example, saving information is level 1 (that will not be saved) or level 2 (that will be saved). Sections whose MEEF is 2 or more are associated with level 2, and information on these sections is saved, as with information on any sections which the comparator 108 has determined to be defective. That is, information on the sections whose MEEF is 2 or more is stored into the primary result storage unit 109a of FIG. 1. Conversely, sections whose MEEF is less than 2 are associated with level 1, and information on these sections is not saved equivalently to information on any sections which the comparator 108 has determined not to be defective. The magnitude of MEEF that becomes a basis for information acquisition can be set as required and is not limited to the data listed in FIG. 8.

The region denoted by region pattern data, and the region based on MEEF region information are likely to overlap in the present embodiment. The multiple sets of region data corresponding to the overlapping regions include the importance level information and MEEF information that form a pair with any one of the multiple sets of region data. If MEEF is equal to or greater than a predetermined value, priority is assigned to the MEEF information, even when a low importance level is defined for the region. If MEEF is less than the predetermined value, however, priority is assigned to the importance level information, irrespective of the importance level, and the pixel value denoted by the resolution based on the importance level information is adopted.

Data that has been saved in the primary result storage unit 109a is transmitted to the lithography simulator and examined for pattern defect printability onto the wafer. The lithography simulator estimates an exposure image transferred from the mask onto the wafer by an exposure system and determines appropriateness of the pattern on the exposure image.

The inspection system 100 of the present embodiment has an interface unit through which data can be exchanged with a lithography simulator which is an external device. This allows the inspection system 100 to send the first inspection results and information necessary for lithography simulation to the lithography simulator 400, as shown in FIG. 6.

The control computer 110 in the inspection system 100 has a cooperating host function to work in conjunction with the lithography simulator 400. When the inspection system 100 instructs, using the cooperating host function, the lithography simulator 400 starts its operation, the lithography simulator 400 simulates the aerial image or resist image of a wafer based on information received from the inspection system 100. Specifically, the lithography simulator 400 simulates, based on the optical images obtained by the inspection system 100, the aerial image or resist image of a wafer to which the pattern formed on the mask has been printed by the photolithography apparatus.

For example, in die-to-die inspection, two or more separate corresponding (or supposedly identical) patterns on the mask are compared to each other to determine the difference (for e.g., in dimension) between them. Next, in addition to both a sensor image that includes a defect obtained from inspection results by the inspection system, and a sensor image as a model, MEEF regional image data that denotes a section whose MEEF is equal to or greater than the predetermined value is transmitted to the lithography simulator. The lithography simulator then simulates the aerial image or the resist image of a wafer to which the pattern on the mask has been printed under predetermined stepper illumination conditions and lithography conditions. During die-to-database comparative inspection, a sensor image that includes a defect obtained from inspection results by the inspection system, reference image data generated from design pattern data, and MEEF regional image data that denotes a section whose MEEF is equal to or greater than the predetermined value are transmitted to the lithography simulator.

The lithography simulator 400 then generates simulated images based on the sensor image including the image of the pattern defect and based on the reference sensor image, and compares these simulated images to evaluate the defect. The lithography simulator 400 also estimates an image for a section of large MEEF, and judges defects by comparing this image with the model sensor image.

Figure 7A:
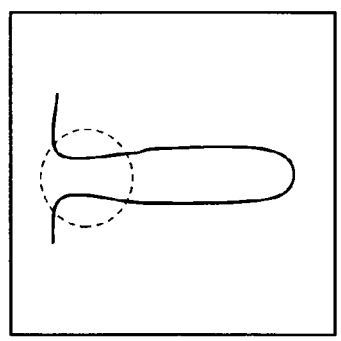
FIG. 7A to 7D shows typical types of defects.
Figure 7B:
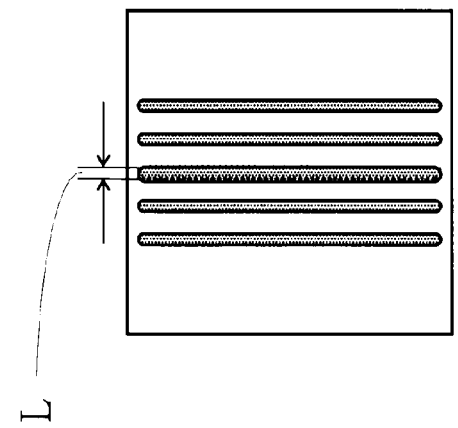
Figure 7C:
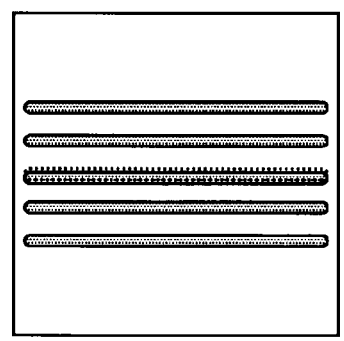
Figure 7D:
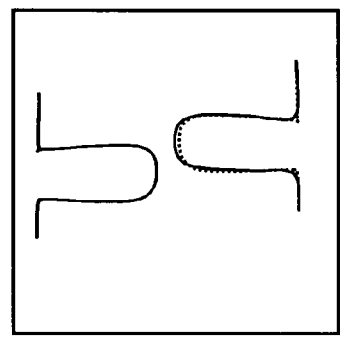

FIGS. 7A to 7D, show exemplary types of defects. In FIG. 7A, a portion (enclosed by the dashed line) of a pattern feature is constricted. FIG. 7B shows a pattern having a line width larger than a predetermined width L. FIG. 7C shows a pattern displaced from its predetermined position (indicated by the dashed line). In FIG. 7D, a pattern feature is displaced from its predetermined position (indicated by the dashed line), and as a result is close to an adjacent pattern feature. For example, when a pattern having one of these defects is found in inspection by the inspection system, the lithography simulator makes two simulations. Specifically, the lithography simulator simulates, based on the sensor image of the defective pattern, the aerial image or resist image of a wafer to which the defective pattern has been printed, and also simulates, based on reference data of the corresponding reference pattern, the aerial image or resist image of the same wafer but to which, instead of the defective pattern, the reference pattern has been printed. The lithography simulator compares the two simulated images, and if the difference (e.g., in dimension) between these images exceeds a predetermined threshold value, the simulator determines that the defect of the defective pattern cannot be tolerated.

The wafer aerial image or resist image that has been estimated for a section of large MEEF is also compared with the wafer aerial image or resist image that has been estimated from reference image data. Similarly, if the value of a determination item exceeds the predetermined threshold value, that pattern is determined to be defective.

The inspection system 100 may be connected to the lithography simulator 400 via a general network. For example, they may transmit data in accordance with the file transfer protocol (FTP), etc. In this case, for example, a network address, a user ID, a login password, etc. must be set before transmitting data. The operation results from the lithography simulator 400 are sent back to the inspection system 100 through the general communications network, as shown in FIG. 2. Receiving the operation results, the inspection system 100 inspects a different optical image of the pattern than that used in the first inspection and produces second inspection results, where this different optical image is selected based on the received operation results, taking into account the image that would be printed to a wafer. The second inspection results are recorded in the secondary result storage unit 109b of FIG. 1.

Figure 6:
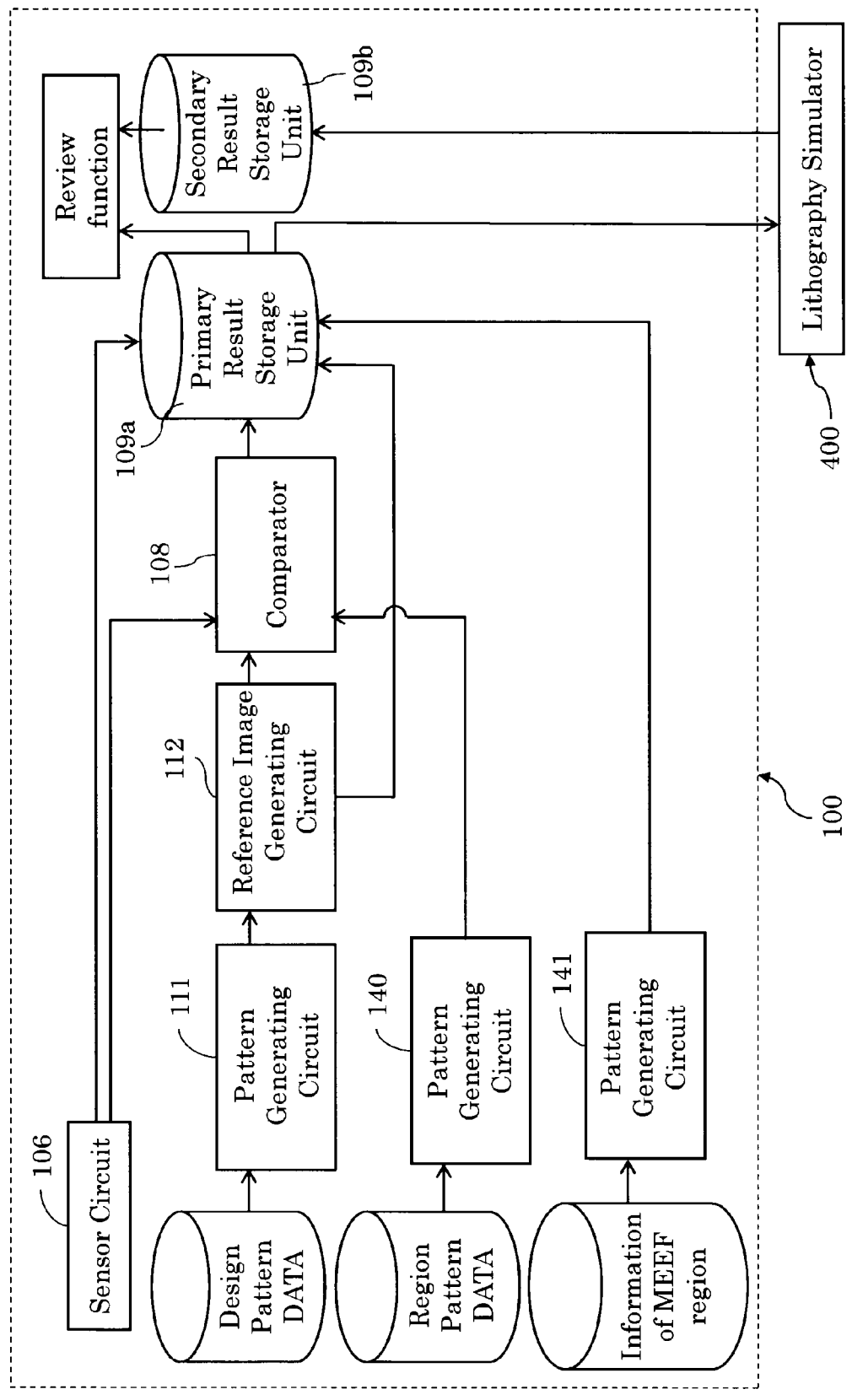
FIG. 6 is a schematic diagram showing a flow of data according to the present embodiment.

The inspection system 100 has a function to display the first and second inspection results for user review, as shown in FIG. 6. This allows the operator to review defects based on the first and second inspection results. In this review process, the operator determines whether a pattern defect found in the inspection is at an acceptable level.

The inspection system 100 is adapted to have a screen for the operator to view defect determination results based on the wafer aerial image or resist image. Thus, since the review screen of the present embodiment shows the first and second inspection results, the operator can compare an optical image of the mask captured by the transmission or reflection optical system of the inspection system, or the corresponding reference image, with a simulated aerial image or resist image of a wafer created by assuming that the mask image has been printed to the wafer under selected lithography conditions. The optical mask images here include optical images of any sections which the inspection system has determined to be defective, and optical images of any sections with large MEEF.

By performing reviews based on the first inspection results and on the second inspection results that incorporate computation results by the lithography simulator, the operator can use the second inspection results as a basis to narrow down the defective sections to be reviewed. As a result, defect determination is facilitated. In addition, since the lithography simulator is an external device, the inspection system can be combined with a suitable simulator according to the situation. In other words, the simulator that operatively associates with the inspection system is not limited to a specific device and can be a highly versatile device.

The inspection system 100 sends information (inspection data) about a mask to the lithography simulator 400 after the completion of the inspection of the mask, it is to be understood that the present embodiment is not limited to this particular method. For example, each time the inspection of the mask has progressed by a predetermined amount, the information obtained during that period may be sent to the lithography simulator 400. The inspection system 100 may be adapted to allow one to select one of these two methods. It should be noted that the above predetermined amount of progress in the inspection may be such that the inspection information is sent each time a predetermined number of stripes (or strip-shaped regions) in the inspection region have been scanned and inspected (where the inspection region is divided into stripes), or each time a predetermined amount of area of the inspection region has been inspected or the number of detected defects has exceeded a predetermined value.

The features and advantages of the present invention may be summarized as follows.

According to the first aspect of the present invention; an inspection system adapted so that before starting die-to-database inspection, the system can reduce the possibility of defects, while at the same time extracting a pattern likely to cause defects upon completion of printing of the pattern onto a wafer, despite the fact that the pattern is determined during a conventional inspection process known not to be defective.

According to the second aspect of the present invention, an inspection system adapted so that before starting die-to-die inspection, the system can reduce the possibility of defects, while at the same time extracting a pattern likely to cause defects upon completion of printing of the pattern onto a wafer, despite the fact that the pattern is determined during a conventional inspection process known not to be defective.

According to the third aspect of the present invention, a inspection method that includes, prior to die-to-database inspection, reducing the possibility of defects, while at the same time extracting a pattern likely to cause defects upon completion of printing of the pattern onto a wafer, despite the fact that the pattern is determined during a conventional inspection process not to be defective.

Provided alternatively is an inspection method that includes, prior to die-to-die inspection, reducing the possibility of defects, while at the same time extracting a pattern likely to cause defects upon completion of printing of the pattern onto a wafer, despite the fact that the pattern is determined during a conventional inspection process not to be defective.

The inspection system of the present embodiment may be connected through a network to other systems and apparatuses, e.g., to one or more other inspection systems, a plurality of lithography simulators, and a mask repair system. In the manufacture of masks in which a plurality of inspection systems are used, the inspection system that produces first inspection results and sends them to the lithography simulator is not necessarily the same as the inspection system that receives the operation results from the lithography simulator and produces second inspection results. When the inspection system that produces the first inspection results is different from the inspection system that produces the second inspection results, these inspection systems may be designed to exchange data such as the inspection results and the operation results from the lithography simulator through a network such as Ethernet©.

The above description of the present embodiment has not specified apparatus constructions, control methods, etc. which are not essential to the description of the invention, since any suitable apparatus constructions, control methods, etc. can be employed to implement the invention. Further, the scope of this invention encompasses all pattern inspection systems and pattern inspection methods employing the elements of the invention and variations thereof which can be designed by those skilled in the art.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2010-008396, filed on Jan. 18, 2010 including specification, claims, drawings and summary, on which the Convention priority of the present application is based, are incorporated herein by reference in its entirety.

The invention claimed is:

1. An inspection system comprising:
an optical image data unit for acquiring optical image data of a mask having predetermined patterns formed thereupon;
a reference image data unit for creating reference image data associated with the optical image data from design pattern data used as a basis to form the patterns;
a regional image data unit for creating regional image data that includes pixel values denoted by multi-valued resolution based upon importance level information relating to the patterns, from region data including at least one portion of the patterns defined in the design pattern data;
a comparator for defect determination on a pixel-by-pixel basis, comparing the optical image data within a region denoted by the regional image data, with the reference image data, by using one of either a plurality of threshold values determined by each pixel value within the regional image data, or a plurality of defect determination methods;
a MEEF (Mask Error Enhancement Factor) regional image data creating unit for creating image data of a section whose MEEF is equal to or greater than a predetermined value, from the region data including at least one portion of the patterns defined in the design pattern data; and
an interface unit that outputs, to a lithography simulator, optical image data of a section determined from the results of the comparison to have MEEF equal to or greater than the predetermined value, and irrespective of whether the results of the comparison by the comparator indicate a defect determination in the section.

2. The inspection system according to claim 1, wherein, when the MEEF is equal to or greater than the predetermined value, image data of regions in which the regional image data and the MEEF regional image data overlap is output to the lithography simulator, regardless of the level of importance in the importance level information.

3. The inspection system according to claim 2, wherein the interface unit connects to the lithography simulator via a general-purpose network communication and instructs the lithography simulator to start computations, and wherein the interface unit further has a function that reads out results of the computations.

4. An inspection system comprising:
an optical image data unit for acquiring a plurality of optical image data of a mask having predetermined patterns formed thereupon;
a regional image data unit for creating regional image data that includes pixel values denoted by multi-valued resolution based upon importance level information relating to the patterns, from region data including at least one portion of the patterns defined in design pattern data used as a basis to form the patterns;
a comparator for defect determination on a pixel-by-pixel basis, comparing the optical images within a region denoted by the regional image data, by using one of either a plurality of threshold values determined by each pixel value within the regional image data, or a plurality of defect determination methods;
a MEEF (Mask Error Enhancement Factor) regional image data creating unit for creating image data upon a section whose MEEF is equal to or greater than a predetermined value, from the region data including at least one portion of the patterns defined in the design pattern data; and
an interface unit that outputs, to a lithography simulator, optical image data of a section determined from the results of the comparison to have MEEF equal to or greater than the predetermined value, and irrespective of whether the results of the comparison by the comparator indicate a defect determination in the section.

5. The inspection system according to claim 4, wherein, when the MEEF is equal to or greater than the predetermined value, image data upon regions in which the regional image data and the MEEF regional image data overlap is output to the lithography simulator, regardless of the level of importance in the importance level information.

6. The inspection system according to claim 5, wherein the interface unit connects to the lithography simulator via a general-purpose network communication and instructs the lithography simulator to start computations, and wherein the interface unit further has a function that reads out results of the computations.

7. An inspection method comprising:
acquiring optical image data from a mask having predetermined patterns formed thereupon; creating regional image data that includes pixel values denoted by multi-valued resolution based upon importance level information relating to the patterns, from region data including at least one portion of the patterns defined in design pattern data which are used as a basis to form the patterns;
prior to defect determination on a pixel-by-pixel basis, comparing the optical images within a region denoted by the regional image data, by using one of either a plurality of threshold values determined by each pixel value within the regional image data, or a plurality of defect determination methods, or prior to defect determination on a pixel-by-pixel basis, creating reference image data associated with the optical images from the design pattern data, and then comparing the optical image data within a region denoted by the regional image data, with the reference image data, by means of one of either a plurality of threshold values determined by each pixel value within the regional image data, or a plurality of defect determination methods;

creating image data upon a section whose MEEF (Mask Error Enhancement Factor) is equal to or greater than a predetermined value, from the region data including at least one portion of the patterns defined in the design pattern data;

outputting, to a lithography simulator, optical image data of a section determined from the results of the comparison to have MEEF equal to or greater than the predetermined value, and irrespective of whether the results of the comparing indicate a defect determination in the section.

* * * * *